United States Patent
Caridis et al.

(10) Patent No.: US 11,459,184 B2
(45) Date of Patent: Oct. 4, 2022

(54) MASS SHAPED DETACHING RAZOR DEVICE AND SYSTEM THEREOF

(71) Applicant: Heat and Control, Inc., Hayward, CA (US)

(72) Inventors: Andrew Anthony Caridis, San Carlos, CA (US); Miguel Angel Gomez Angulo, Zapopan (MX); Sergio Gonzalez Granados, Tlaquepaque (MX)

(73) Assignee: Heat and Control, Inc., Hayward, CA (US)

( * ) Notice: Subject to any disclaimer, the term of this patent is extended or adjusted under 35 U.S.C. 154(b) by 29 days.

(21) Appl. No.: 16/618,318

(22) PCT Filed: Nov. 15, 2017

(86) PCT No.: PCT/IB2017/057134
§ 371 (c)(1),
(2) Date: Nov. 29, 2019

(87) PCT Pub. No.: WO2018/116024
PCT Pub. Date: Jun. 28, 2018

(65) Prior Publication Data
US 2021/0276209 A1      Sep. 9, 2021

(30) Foreign Application Priority Data
Jun. 5, 2017    (MX) ............... MX/a/2017/007046

(51) Int. Cl.
*B65G 45/16* (2006.01)
*B65G 45/10* (2006.01)
*B26B 21/52* (2006.01)

(52) U.S. Cl.
CPC ............ *B65G 45/16* (2013.01); *B26B 21/521* (2013.01)

(58) Field of Classification Search
None
See application file for complete search history.

(56) References Cited

U.S. PATENT DOCUMENTS

| 4,533,036 A | 8/1985 | Gordon |
| 4,962,845 A | 10/1990 | Gibbs |

(Continued)

FOREIGN PATENT DOCUMENTS

| CA | 2972241 A1 | 6/2016 |
| CN | 1144526 C | 4/2004 |

(Continued)

OTHER PUBLICATIONS

Rotometrics, 'RD Razor Slitter Units', Sep. 18, 2016 [online] retrieved from <URL: https://web.archive.org/web/20160918064400/ http://www.rotometrics.com/our-products/additional-products/rd-razor-slitter-units/>.

(Continued)

*Primary Examiner* — Kavel Singh
(74) *Attorney, Agent, or Firm* — Intellectual Innovations Legal Advisors

(57) ABSTRACT

A mass shaped detaching razor device for detaching mass shapes from a laminating roller without damaging the same is provided, said device comprises a main support coupled on its upper section with a lower end of a pressure arm by means of a 5 pivot coupling, the main support is coupled on its lower section with a razor support having on a frontal end a detachment razor, a shock absorber coupled on its lower end to a back end of the main support and coupled by its upper end to an upper end of the pressure arm.

16 Claims, 6 Drawing Sheets

(56) References Cited

U.S. PATENT DOCUMENTS

| | | | |
|---|---|---|---|
| 4,966,541 | A | 10/1990 | Mistretta |
| 5,248,026 | A | 9/1993 | Morefield |
| 6,296,105 | B1 | 10/2001 | Carnes |
| 6,361,609 | B1 | 3/2002 | Ouellette et al. |
| 6,443,294 | B1 * | 9/2002 | Brody .................... B65G 45/16 198/499 |
| 7,669,708 | B2 * | 3/2010 | Swinderman .......... B65G 45/16 198/499 |
| 8,679,563 | B1 | 3/2014 | Herrera |
| 9,278,815 | B2 * | 3/2016 | Kishor .................... B65G 45/16 |
| 2003/0113145 | A1 | 6/2003 | Okabayashi |
| 2004/0069598 | A1 | 4/2004 | DeVries |
| 2005/0175728 | A1 | 8/2005 | Herrera |
| 2008/0053791 | A1 | 3/2008 | Swinderman et al. |
| 2009/0016769 | A1 | 1/2009 | Hatakeyama et al. |
| 2010/0132204 | A1 | 6/2010 | Brown |
| 2012/0255185 | A1 | 10/2012 | Patel et al. |

FOREIGN PATENT DOCUMENTS

| | | |
|---|---|---|
| CN | 102806574 A | 12/2012 |
| JP | H 8-2232 B2 | 1/1996 |
| JP | H 10-225256 A | 8/1998 |
| JP | 2003-186362 A | 7/2003 |
| JP | 3097230 U | 1/2004 |
| JP | 4395187 B2 | 1/2010 |
| JP | 4724622 B2 | 7/2011 |
| JP | 2016-519031 A | 6/2016 |
| KR | 2003/0008005 A | 1/2003 |
| WO | 95/05742 A2 | 3/1995 |
| WO | 95/05742 A3 | 1/1996 |
| WO | 01/26473 A1 | 4/2001 |
| WO | 2008/027731 A2 | 3/2008 |
| WO | 2016/105557 A1 | 6/2016 |

OTHER PUBLICATIONS

Response dated Dec. 7, 2020 to Office Action dated Jul. 24, 2020 for Chinese Patent Application No. 201780088835.9, filed Nov. 15, 2017, pp. 1-7.
Translation of response dated Dec. 7, 2020 to Office Action dated Jul. 24, 2020 for Chinese Patent Application No. 201780088835.9, filed Nov. 15, 2017, pp. 1-6.
Extended European Search Report dated Feb. 13, 2020 for European Patent Application No. 17885084.8, filed Nov. 15, 2017, pp. 1-6.
International Search Report dated Mar. 19, 2018, for Application No. PCT/US2017/057134, filed Nov. 15, 2017, pp. 1-3.
Office Action dated Feb. 10, 2020 for Chilean Patent Application No. 201901946, filed Nov. 15, 2017, pp. 1-17.
Office Action dated Feb. 10, 2020 for Japanese Patent Application No. 2019-546015, filed Nov. 15, 2017, pp. 1-2 (with Translation).
Office Action dated May 15, 2020 for Chilean Patent Application No. 201901946, filed Nov. 15, 2017, pp. 1-18.
Office Action dated Jul. 24, 2020 for Chinese Patent Application No. 201780088835.9, filed Nov. 15, 2017, pp. 1-5 (with Translation).
Response dated May 7, 2020 to Office Action dated Feb. 10, 2020 for Chilean Patent Application No. 201901946, filed Nov. 15, 2017, pp. 1-13.
Response dated Jun. 3, 2020 to Office Action dated Feb. 10, 2020 for Japanese Patent Application No. 2019-546015, filed Nov. 15, 2017, pp. 1-3 (with Translation).
Response dated Aug. 11, 2020 to Office Action dated May 15, 2020 for Chilean Patent Application No. 201901946, filed Nov. 15, 2017, pp. 1-13.
Response dated Aug. 21, 2020 to EPO communication dated Feb. 13, 2020 for European Application No. 17885084.8, filed Nov. 15, 2017, pp. 1-16.
Translation of Office Action dated Feb. 10, 2020 for Japanese Patent Application No. 2019-546015, filed Nov. 15, 2017, pp. 1-2.
Translation of Office Action dated Jul. 24, 2020 for Chinese Patent Application No. 201780088835.9, filed Nov. 15, 2017, pp. 1-4.
Translation of Response dated Jun. 3, 2020 to Office Action dated Feb. 10, 2020 for Japanese Patent Application No. 2019-546015, filed Nov. 15, 2017, pp. 1-3.
Written Opinion dated Mar. 19, 2018 for Application No. PCT/US2017/057134, filed Nov. 15, 2017, pp. 1-3.

* cited by examiner

MASS SHAPED DETACHING RAZOR DEVICE AND SYSTEM THEREOF

OBJECT OF THE INVENTION

Present invention provides a mass shaped detaching razor device, which allows detaching the mass shapes from the laminating roller without damaging the same, in such a way that if an imperfection should occur in said device, it would only be necessary to remove one specific razor device, not being necessary to stop the functioning of the laminating rollers.

BACKGROUND

The concept of a razor device was born from the need of eliminating setbacks which the use of metallic threads for removing the product from the laminators entails.

We have knowledge of U.S. Pat. No. 4,966,541 dated Oct. 30, 1990 which describes a wire detachment adjustor for laminating rollers which present mass in laminated shapes formed between a pair of roller and separated from a roller by the detachment wire subject to tension by means of guides set in order to align the detachment wire with end peripheries opposite to the roller, which present an infinity of variable positions.

Similarly, we also have knowledge of U.S. Pat. No. 8,679,563 B1 dated Mar. 25, 2015 which refers to a laminator which presents a frontal roller without an inner groove, a back roller configured to rotate in the opposite direction from the frontal roller, a detachment wire partially spiral coupled through the frontal roller and a conveyor band connected to a proximal conveyor roller and a distal conveyor roller.

Metallic threads, although efficient, have the disadvantage of easily becoming damaged if they are not used in the correct manner, which has as a consequence the complete shutdown of the production line in order to make a substitution.

Present device completely replaces the metallic thread, improving the yield of the laminating equipment.

BRIEF DESCRIPTION OF THE INVENTION

Present invention provides a mass shaped detaching razor device which comprises a pressing arm with a lower section and an upper section; a main support with an upper section, a lower section and a back section, the upper section of the main support coupled to the lower section of the pressing arm, by means of a first pivot coupling, a razor support coupled to the lower section of the main support; a detachment razor set on a frontal section of the razor support; a shock absorber coupled on its lower section with the back section of the main support and on its upper section to the upper section of the pressing arm.

Additionally, present invention refers to a detachment razor system which comprises a right lateral support and a left lateral support, a support bar coupled on the upper ends of said lateral supports and between the same, a pivot bar coupled between said lateral supports, underneath the support bar, and at least one mass shaped detaching razor device which comprises a main support, which is found coupled by its upper section to a lower end of a pressing arm by means of a pivot coupling, the main support is coupled by its lower section to a razor support, the razor support presents in a frontal end a detachment razor, a shock absorber coupled by its lower end with a back end of the main support and coupled by its upper end to an upper end of the pressing arm, said razor device is found coupled unto the pivot bar by the first pivot coupling.

BRIEF DESCRIPTION OF THE FIGURES

The illustrative embodiment may be described referencing the accompanying figures, which refer to.

DETAILED DESCRIPTION OF THE INVENTION

Figure 1:
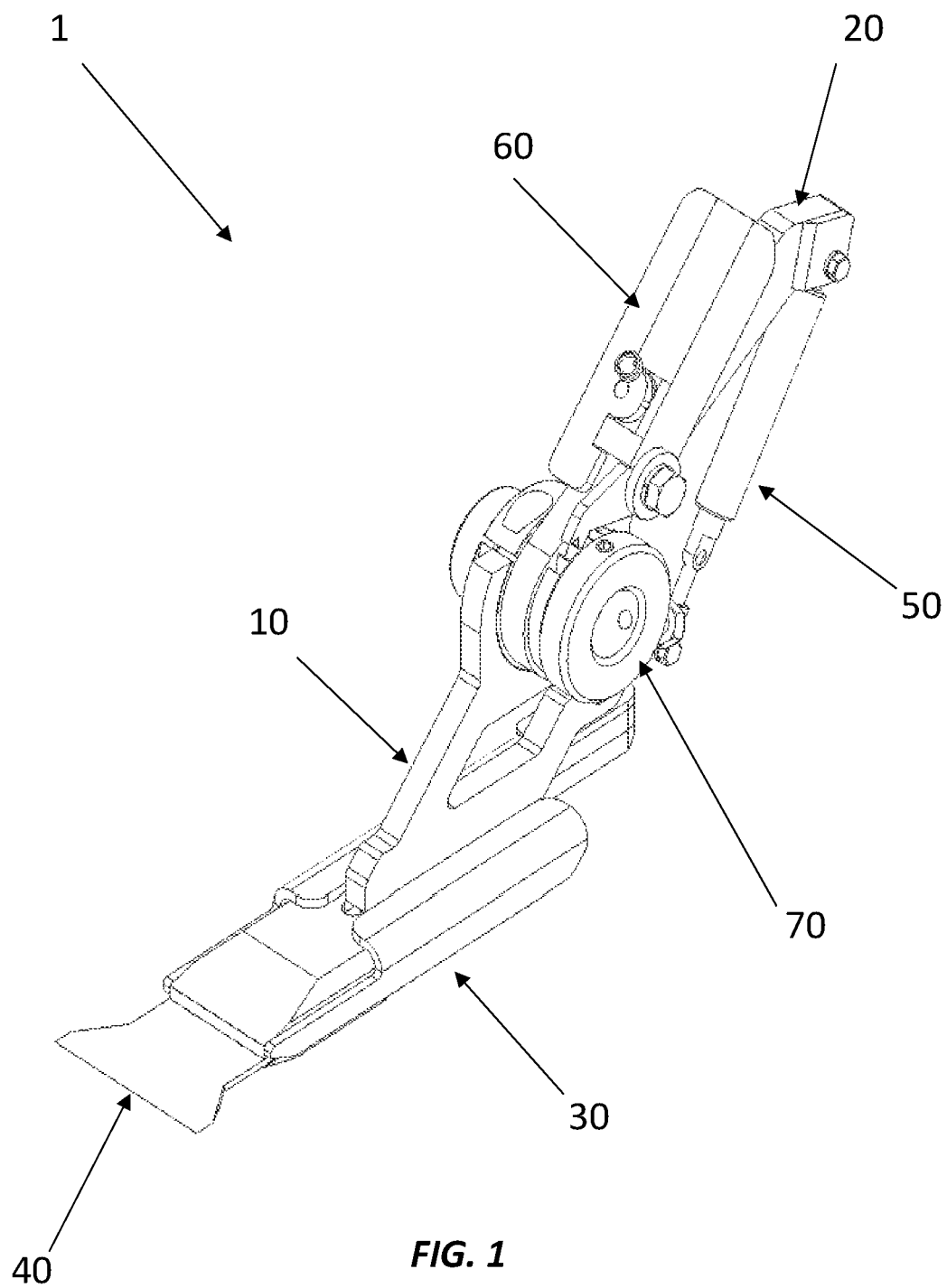
FIG. 1 shows a perspective view of a detaching razor device.
Figure 2:
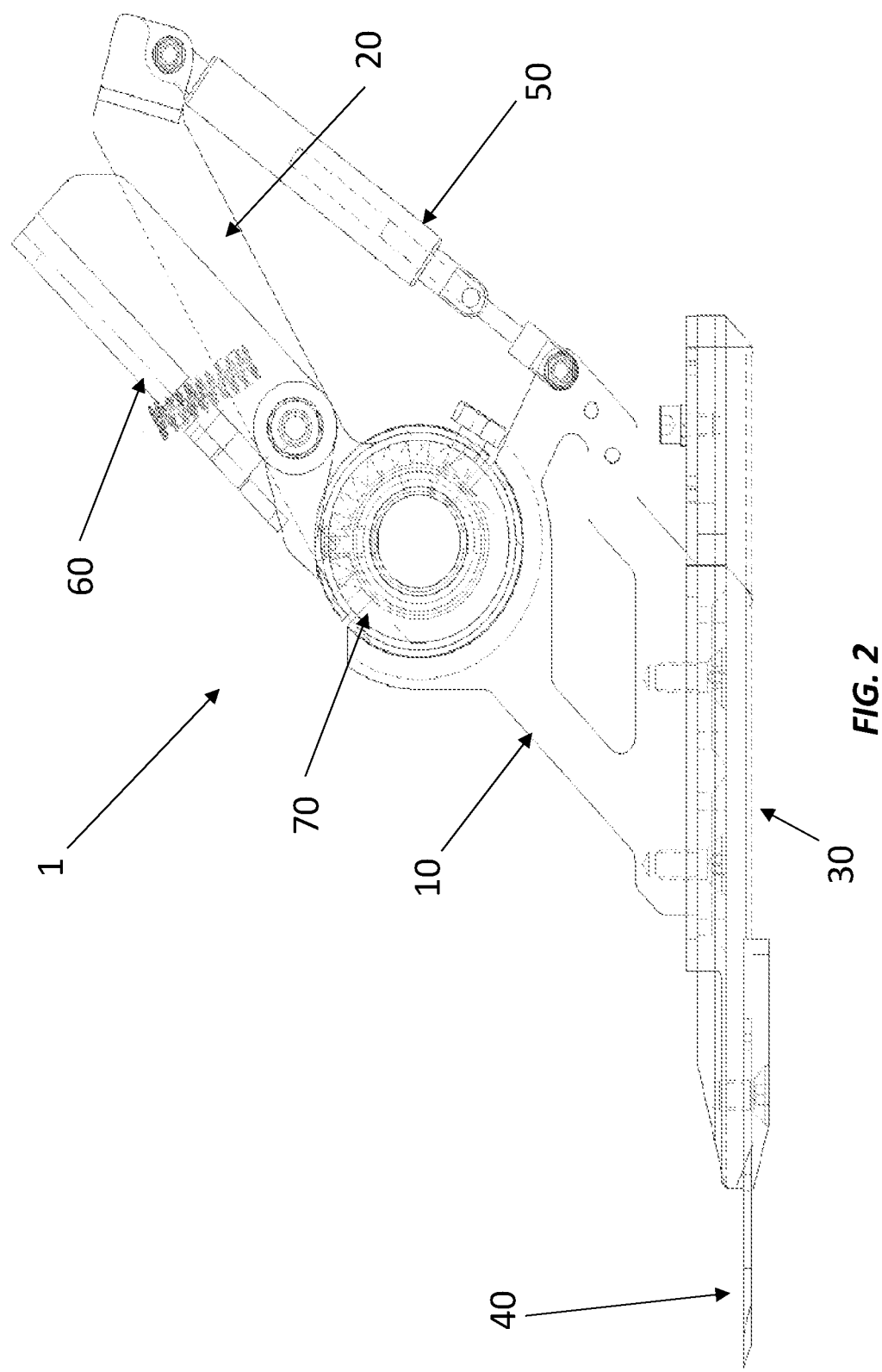
FIG. 2 shows a lateral view of a detaching razor device.
Figure 3:
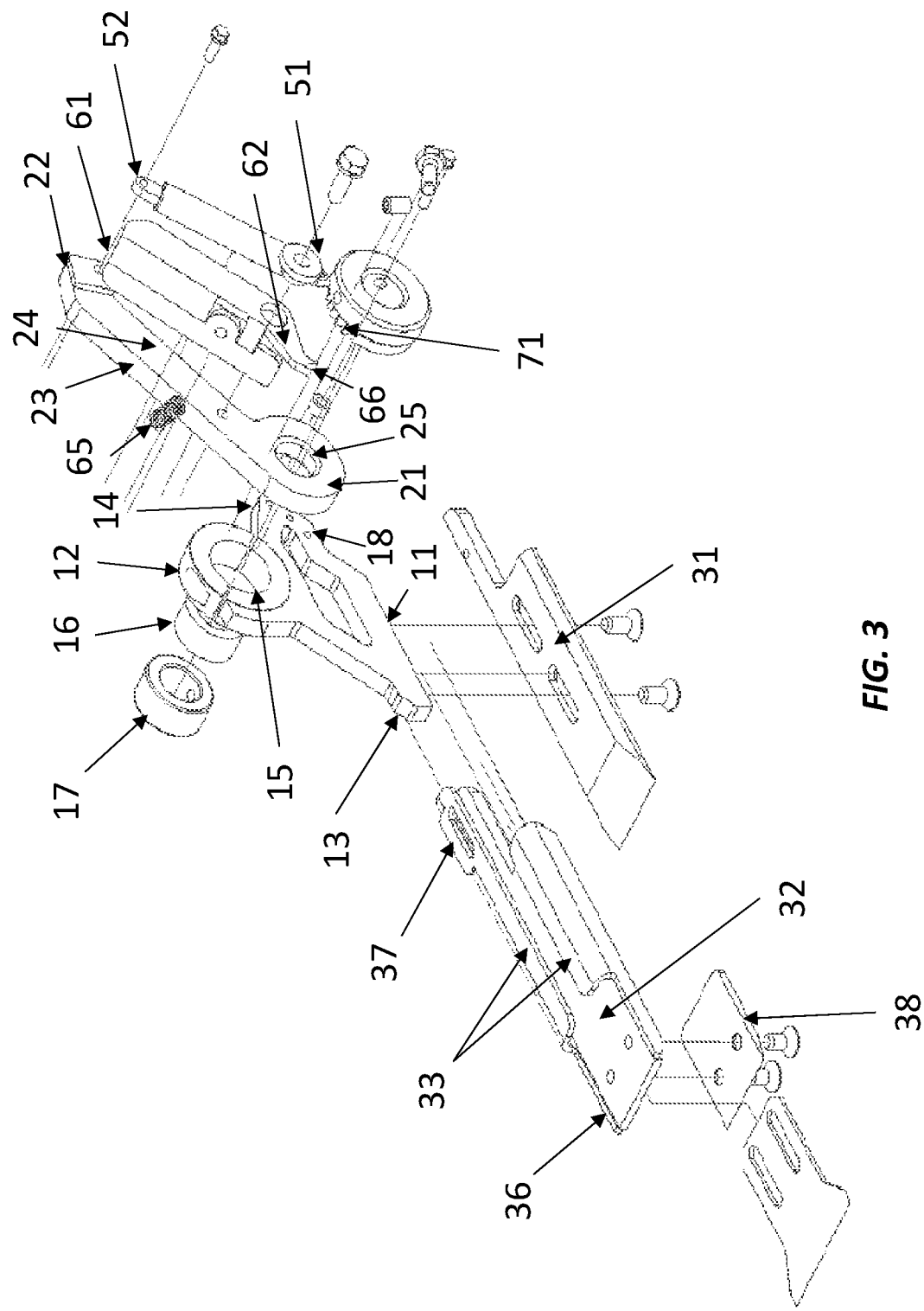
FIG. 3 shows an exploded view of a detaching razor device.
Figure 4:
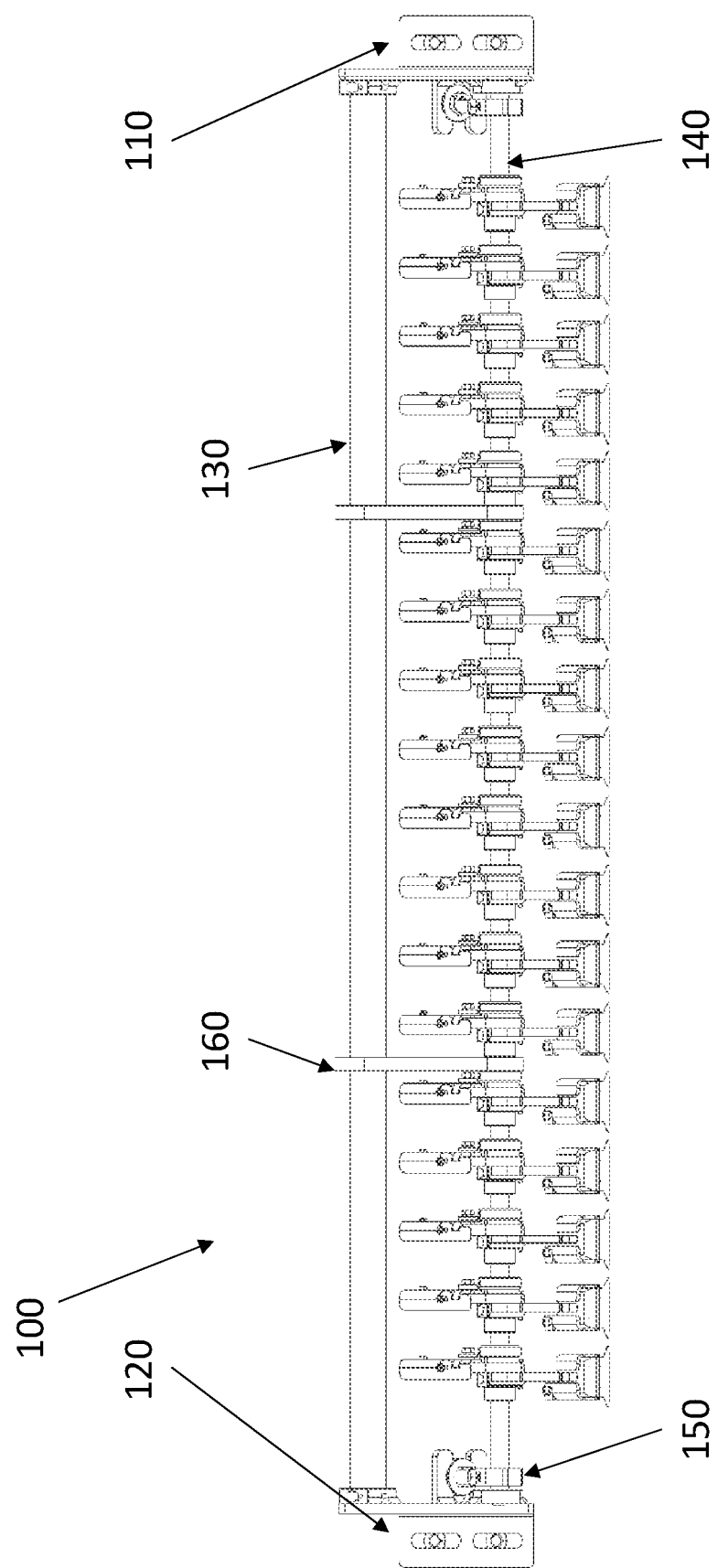
FIG. 4 shows a frontal view of a detaching razor system.
Figure 5:
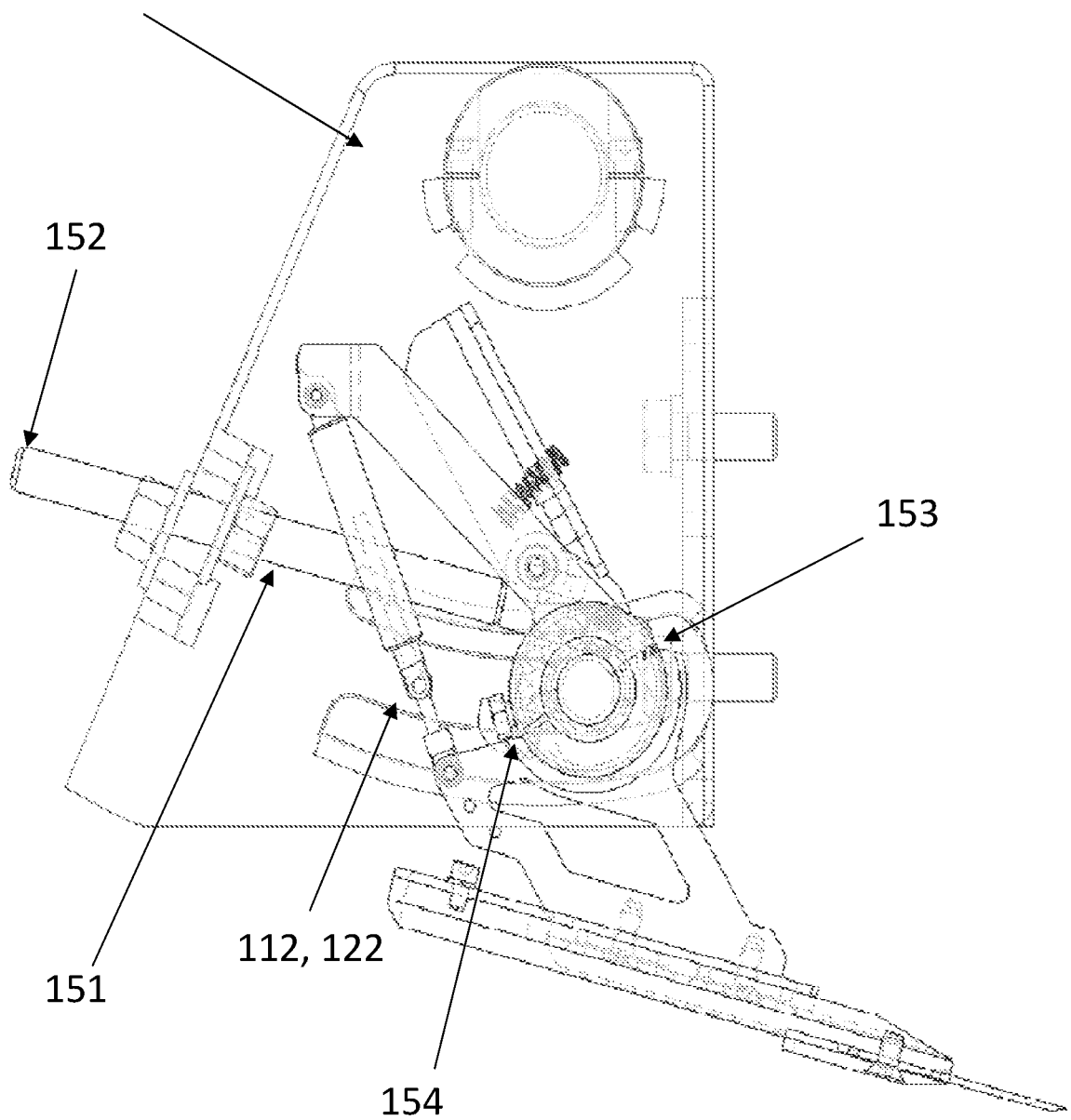
FIG. 5 shows a lateral view of a detaching razor device mounted on its support.
Figure 6:
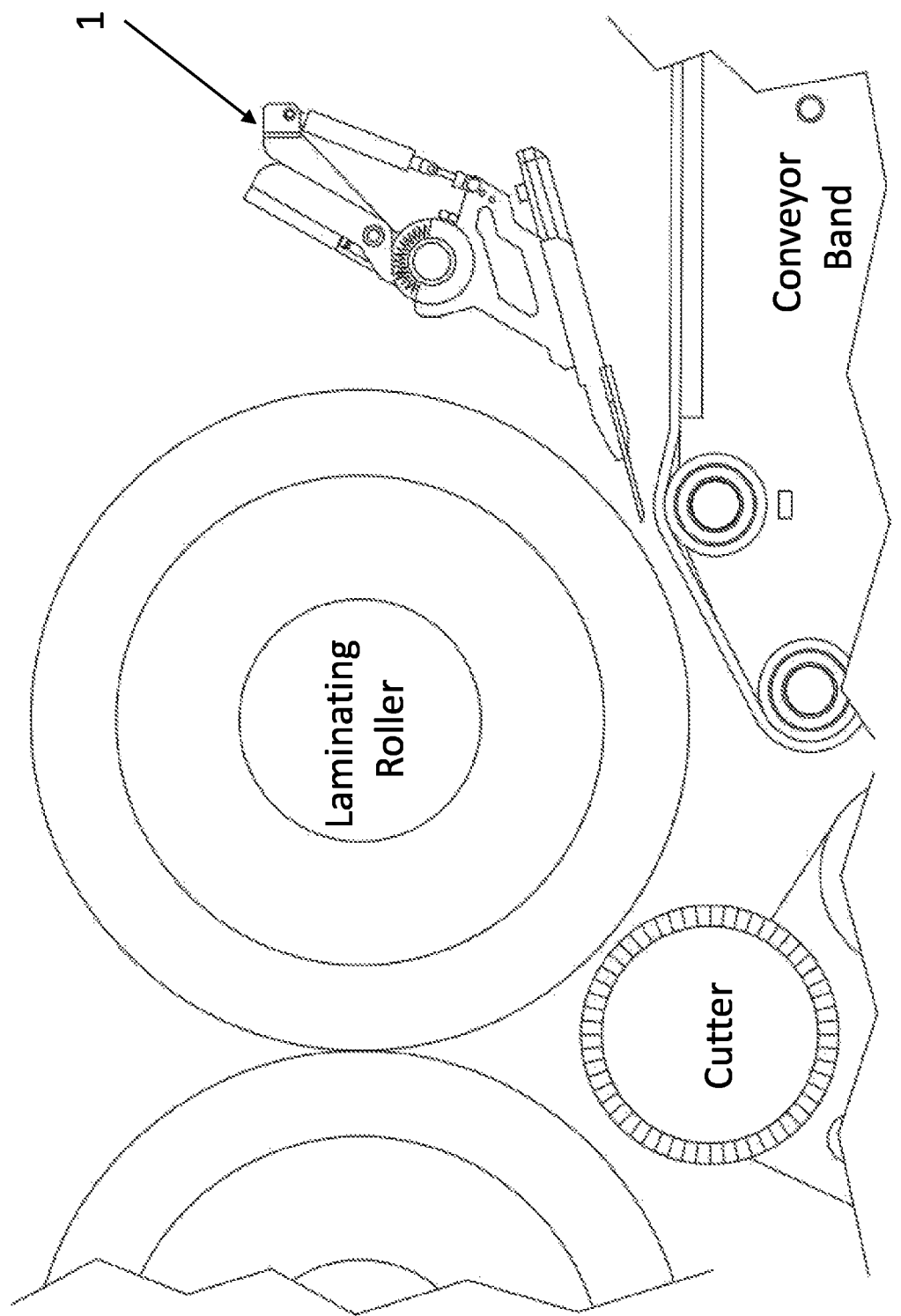
FIG. 6 shows a lateral view illustrating the functioning of the detaching razor device.

The following description makes references to FIGS. 1 through 6 in an indistinctive manner.

The mass shaped detaching razor device (1) of present invention comprises a main support (10), which presents a lower section (11), an upper section (12), a frontal section (13) and a back section (14), the upper section (12) has a circular opening (15) in which a bushing (16) is coupled unto and a securing collar (17), while the back section (14) presents at least two perforations (18), which have the same diameter but are at different heights; similarly, the lower section (11) is smooth.

Said main support (10) is found coupled by its upper section (12) with a lower section (21) of a pressing arm (20), it should be noted that said lower section (21) presents a circular opening (25), which is coincident with the circular opening (15) of the upper section (12) of said main support, likewise said pressing arm (20) also presents an upper section (22), a frontal face (23) and at least one lateral face (24); said coupling between the main support (10) and the pressing arm (20) corresponds to a first pivot coupling, similarly it also presents a second pivot coupling on said at least one lateral face (24), said second pivot coupling being set above the first pivot coupling.

Said main support (10) is found coupled by its lower section (11) unto a razor support (30), wherein the razor support (30) comprises a fixed support (31) as well as a guided support (32), wherein the guided support (32) is found in slidable coupling with the fixed support (31) by means of a pair of longitudinal flanges (33), which are arranged at the lateral ends of the guided support (32), which are coupled to the lateral ends of the fixed support (31).

The guiding support (32) has a frontal section (36) and a back section (37), on said frontal section (36) a razor (40) is removably coupled, below said razor (40) a lower support (38) is found, which holds the razor (40) coupled unto the guided support (32). It should be mentioned that the razor (40) may present shape and size modifications, which do not deviate from the scope of the invention.

Set between the back section (14) of the main support (10) and the upper section (22) of the pressing arm (20) is a gas shock absorber (50), in such a way that a lower section (51) of the gas shock absorber (50) is found coupled with the back section (14) of the main support (10), and an upper section (52) of the gas shock absorber (50) is found coupled with the upper section (22) of the pressing arm (20); the lower section (51) of the gas shock absorber (50) is coupled into one of said at least two perforations (18) of the back section (14) of the main support (10).

The gas shock absorber (50) modifies the inclination of the main support (10) with regard to the pressing arm (20), in such a way that when said shock absorber (50) is found in a retracted position, the main support (10), presents a first inclination and when the gas shock absorber (50) is in an expanded position, the main support (10) presents a second inclination, the first inclination being different from the second inclination.

In said second pivot coupling, a pressure lever (60) is coupled, which presents a distal end (61), a proximal end (62) and two longitudinal sections perpendicular to each other attached at a vertex, in such a way that said pressure lever (60) partially wraps the pressing arm (20), found between the pressing arm (20) and the pressure lever (60), a pressure spring (65) is found, which is perpendicular to the second pivot coupling, so that it is located on the frontal face (23) of the pressing arm (20); similarly, the proximal end (62) of the pressure lever (60) has a toothed border edge (66) which is coupled to a plurality of teeth (71) of a brake wheel (70) set on a side of said first pivot coupling.

The mass shaped razor detachment device (1) of present invention may be installed together with other similar devices in order to form a detachment razor system (100), said detachment razor system (100) presents a right lateral support (110), a left lateral support (120), a support bar (130) coupled at the upper ends (111, 121) of said lateral supports (110, 120) and between them, a pivot bar (140) coupled between said lateral supports (110, 120), below the support bar (130), said pivot bar is coupled unto the first pivot coupling of said mass-shaped razor detachment devices (1).

On said lateral supports (110, 120) a calibrator hook (150) is found coupled, said calibrator hook (150) comprises a threaded straight bar (151) which presents a proximal end (152) as well as a distal end (153), wherein said distal end (153) presents in a hooked shape (154), which couples the pivot bar (140), by means of said calibrating hook, the approaching of the mass shaped detachment razor device (1) to a laminating roller is calibrated.

The lateral supports (110, 120) present on their inner surface at least one guiding groove (112, 122), over which the pivot bar (140) slides.

Should the length of the system (100) be excessive, at least one intermediate support (160) is provided between said lateral supports, the number of intermediate supports (160) shall vary depending on the length of the system (100).

Each razor (40) of the razor detachment system (100) is found aligned with a ribbon (not shown) of a cutter, in such a way so as to ensure that the razor (40) entirely covers the outline of the shapes of said cutter, likewise, each razor (40) is individually calibrated.

Alterations to the structure hereby described for the present invention could be foreseen by those persons skilled in the art. However, it must be understood that present description is related with the preferred embodiments of the invention, which is merely for illustrative purposes and must not be construed as a limitation of present invention. All obvious modifications in the spirit of the invention, such as changes to the shape, material and sizes of the different elements which make up the invention, must be considered to lie within the scope of the attached claims.

The invention claimed is:

1. Mass shaped detaching razor device comprising
a pressing arm with a lower section and an upper section;
a main support with an upper section, a lower section and a back section, the upper section of the main support coupled to the lower section of the pressing arm by means of a first pivot coupling;
a razor support coupled to the lower section of the main support and having a frontal section;
a detachment razor set on the frontal section of the razor support; and
a shock absorber with a lower section and an upper section, the lower section of shock absorber coupled with the back section of the main support and the upper section of the shock absorber coupled to the upper section of the pressing arm.

2. The device according to claim 1, wherein the pressing arms presents a second pivot coupling above the first pivot coupling.

3. The device according to claim 2, further comprising a pressure lever with a distal end, a proximal end and two longitudinal sections perpendicular to each other attached at a vertex, the pressure lever being coupled to the second pivot coupling in such a way that the pressure lever partially wraps the pressing arm.

4. The device according to claim 3, further comprising a pressure spring set between the pressing arm and the pressure lever in a manner perpendicular to the second pivot coupling.

5. The device according to claim 3, further comprising a brake wheel set on a side of the first pivot coupling and having a plurality of teeth, the proximal end of the pressure lever having a toothed border edge coupled to the plurality of teeth of the brake wheel.

6. The device according to claim 1, wherein the razor support includes a fixed support with lateral ends and a guided support with lateral ends, the guided support being slidably coupled with the fixed support by means of a pair of longitudinal flanges coupled to the lateral ends of the fixed support and set on the lateral ends of the guided support.

7. The device according to claim 6, wherein the guided support has a frontal section and a back section, the razor being coupled to the frontal section of the guided support in a detachable manner, further comprising a lower support underneath the razor for keeping the razor coupled onto the guided support.

8. The device according to claim 1, wherein the shock absorber modifies the inclination of the main support with regard to the pressing arm in such a way that when said shock absorber is found in a retracted position the main support presents a first inclination, and when the shock absorber is in an expanded position the main support presents a second inclination, the first inclination being different from the second inclination.

9. A razor detachment system for use with a roller comprising
a right lateral support with an upper end and a guiding groove;
a left lateral support with an upper end and a guiding groove;
a support bar coupled on the upper ends of said lateral supports and between the same;
a pivot bar extending between said lateral supports and having opposite ends and a length extending between the ends, the ends of the pivot bar seated within the respective guiding grooves of the lateral supports;

a plurality of mass shaped detaching razor devices carried along the length of the pivot bar; and at least one threaded bar carried by the lateral supports and having a distal end for engaging and moving the pivot bar along the guiding grooves so as to align each of the plurality of mass shaped detaching razor devices with the roller.

10. The razor system according to claim 9, wherein the at least one threaded bar is coupled onto said lateral supports.

11. The razor system according to claim 10, wherein the at least one threaded bar is a calibrator hook and the distal end of the at least one threaded bar is hooked in shape.

12. The razor system according to claim 9, wherein each of the guiding grooves is curved.

13. The razor system according to claim 9, wherein should the length of the system be excessive, at least one intermediate support is provided between said lateral supports.

14. The razor system according to claim 9, wherein each mass shaped detaching razor of the razor detachment system is found aligned with a ribbon of a cutter in such a way so as to ensure that the mass shaped detaching razor entirely covers the outline of the shapes of said cutter.

15. The razor detachment system according to claim 14, wherein each razor is individually calibrated.

16. Mass shaped detaching razor device comprising
a pressing arm with a lower section and an upper section;
a main support with an upper section, a lower section and a back section, the upper section of the main support coupled to the lower section of the pressing arm by means of a first pivot coupling;
a pressure lever with a distal end, a proximal end and two longitudinal sections perpendicular to each other attached at a vertex, the pressure lever being coupled to the pressing arm by a second pivot coupling so as to partially wrap the pressing arm;
a brake wheel set on a side of the first pivot coupling and having a plurality of teeth, the proximal end of the pressure lever having a toothed border edge coupled to the plurality of teeth of the brake wheel;
a razor support coupled to the lower section of the main support and having a frontal section;
a detachment razor set on the frontal section of the razor support; and
a shock absorber with a lower section and an upper section, the lower section of shock absorber coupled with the back section of the main support and the upper section of the shock absorber coupled to the upper section of the pressing arm.

\* \* \* \* \*